United States Patent [19]

Fagerburg et al.

[11] Patent Number: 4,826,956
[45] Date of Patent: May 2, 1989

[54] PROCESS FOR THE PREPARATION OF COPOLY(ARYLENE SULFIDE) USING AN OXYGEN-CONTAINING GAS

[75] Inventors: David R. Fagerburg; Joseph J. Watkins; Paul B. Lawrence; Mark Rule, all of Kingsport, Tenn.

[73] Assignee: Eastman Kodak Company, Rochester, N.Y.

[21] Appl. No.: 196,711

[22] Filed: May 20, 1988

[51] Int. Cl.$^4$ ............................................. C08G 75/14
[52] U.S. Cl. .................................. 528/214; 528/219; 528/222; 528/226; 528/364; 528/389; 528/483
[58] Field of Search ............... 528/388, 389, 483, 214, 528/219, 222, 226, 364

[56] References Cited

U.S. PATENT DOCUMENTS 2,513,188  6/1950  Macallum .
2,538,941  1/1951  Macallum .
3,285,882  11/1986 Pike .
3,354,129  11/1967 Edmonds, Jr. et al. .
4,645,825  2/1987  Idel et al. .
4,645,826  2/1987  Iizuka et al. .
4,786,713  11/1988 Rule et al. ........................... 528/389

FOREIGN PATENT DOCUMENTS 125721  7/1983  Japan .................................. 528/389

Primary Examiner—John C. Bleutge
Assistant Examiner—David W. Woodward
Attorney, Agent, or Firm—Charles R. Martin; William P. Heath, Jr.

[57] ABSTRACT

A process for producing a copoly(arylene sulfide) corresponding to the structure $$[(-A-S-)_{1-x}(-A-S-S-)_x]_n$$

wherein A is a divalent substituted or unsubstituted aromatic radical, x is in the range of 0.5 to 0.001 and n is at least 200, comprising reacting within a reaction zone a mixture of a diiodoaromatic compound and elemental sulfur at a polymer producing temperature wherein the reaction zone contains an oxygen-containing gas flowing at a rate in the range of 0.001 to 0.08 ft3/hr/mol of oxygen per mole of sulfur.

13 Claims, No Drawings

PROCESS FOR THE PREPARATION OF COPOLY(ARYLENE SULFIDE) USING AN OXYGEN-CONTAINING GAS

The invention relates to a process for the preparation of a copoly(arylene sulfide) by reacting a diiodoaromatic compound and elemental sulphur in the presence of a flowing stream of an oxygen-containing gas.

Poly(arylene sulfide) resins are thermosetting-thermoplastic polymeric materials with good thermal stability, unusual insolubility, resistance to chemical environments and inherent flame resistance. These resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment.

Poly(phenylene sulfide) is a commercial product which is generally produced by reacting p-dichlorobenzene with sodium sulfide in a polar organic solvent. This process is known as the Edmonds & Hill polymerization procedure and is disclosed in U.S. Pat. No. 3,354,129. Another approach to preparation of poly(phenylene sulfide) is the Macallum process wherein p-dichlorobenzene and sulfur are reacted in the presence of sodium carbonate. This process is disclosed in U.S. Pat. Nos. 2,513,188 and 2,583,941. An improvement on the Macallum polymerization procedure involves adding N-haloamides as catalysts as disclosed in U.S. Pat. No. 3,285,882.

The polymer which is formed in the Edmonds & Hill process has only a modest molecular weight on the order of 10,000-40,000 and has relatively low melt viscosity. Higher molecular weights can be obtained by heating the PPS in the presence of oxygen. During heating, the molecular weight of the PPS increases due to a variety of chemical reactions including oxidation, crosslinking and chain extension. These curing reactions result in polymers which have inherent brittleness and reduced drawing capability while only achieving modest increases in molecular weight. Additionally, polymer is produced by polymerization in the presence of sulfide and/or hydrosulfide salts, such as sodium sulfide and sodium hydrosulfide, has a residual content of inorganic salt present in the polymer. These residual salts are, for example, sodium chloride and sodium sulfide resulting from the combination of the sodium cation with chlorine or sulfide from the starting materials. The presence of these residual salts in the polymer increases the corrosive nature of the polymer and can cause a deterioration in the drawing or spinning characteristics of the polymer. Residual salts can also result in breakages in the spun fibers and additionally contribute to plugging and clogging of the spinnert holes.

An additional problem with polymer produced by the Edmonds & Hill process is the high rate of crystallization of these polymers. Although some applications do require high rates of crystallization, many applications require much slower rates of crystallization. These polymers contain no substantial quantities of disulfide units.

U.S. Pat. No. 4,645,826 discloses a process of preparing "ultra-high molecular weight" linear poly(arylene sulfide) by first preparing a prepolymer with a melt viscosity between 5-3,000 poise and then performing a liquid-liquid two-phase polymerization. Only dichloroaromatic compounds are disclosed and the prepolymer is formed using a conventional alkaline metal sulfide. The "ultra-high molecular weight" polymers have melt viscosities of only tens of thousands of poise. The prepolymer is formed by a standard Edmonds Hill polymerization in the presence of an alkali metal sulfide. Accordingly, the polymers produced will suffer from the problems associated with residual salt content noted above. These polymers are also though to contain no substantial quantities of disulfide units.

U.S. Pat. No. 4,645,825 also discloses poly(arylene sulfide) produced using dichloroaromatic or dibromoaromatic compounds and polymerizing in the presence of conventional alkaline metal sulfides or hydrosulfides. Although polymers with relatively high molecular weights and melt viscosities can be produced by this process, the presence of residual inorganic salts in the polymer results in inferior corrosion characteristics as well as poor spinning and drawing capability. These polymers are also thought to have no substantial quantities of disulfide units.

We have now discovered a process which can be used to prepare a poly(arylene sulfide) which does not contain substantial quantities of alkali metals and has an adjustable rate of crystallization. The polymers prepared using the processing of the invention do not contain substantial quantity of alkali metals simply because no alkali metal is used in the process used to prepare the polymer. Although Applicants do not wish to be limited to any particular theory, it is believed that the variable rate of crystallization of the copolymer prepared using the process is due to the presence of small amounts of (—A—S—) or disulfide units in the polymer chain. Thus, the polymers prepared by this process can be considered to be copolymers. The presence of these disulfide units in the copolymer do not materially affect other important properties of the polymer, such as glass transition temperature, solvent resistance, thermal stability, and oxidative stability.

The vast majority of units in the copolymer prepared by the process of this invention are the (—A—S—) unit and the number of (—A—S—S—) or disulfied units are small compared to the number of (—A—S—) units. Generally, the fraction of (—A—S—S—) units is in the range of 0.5 to 0.001, based on the combined number of both (—A—S—) and (—A—S—S—) units. Thus, the copolymer prepared by the process of the invention can be represented as

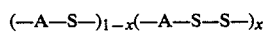

where x is in the range of 0.5 to 0.001. The sequence of (—A—S—) and (—A—S—S—) units is thought to be random throughout the molecular chain. When x is in the range of 0.5 to 0.2 the polymers obtained when A is p-phenylene are amorphorus and can be crystallized only with difficulty. When x is in the range of 0.2 to 0.1 the polymers obtained can be thermally crystallized and have crystalline melting points of 230-260 degree C. When x is in the range of 0.1 to 0.05 the polymers obtained have moderate crystallization rates and the crystallized polymers can be annealed to high crystalline melting points (280°-290° C.) and show Tch (temperature of crystallization on heating) and Tcc (temperature of crystallization on cooling) at increasingly lower and higher temperatures, respectively, indicative of increasing rates of crystallization. When x is in the range of 0.05 to 0.001 the crystallization rate increases rapidly with decreasing x.

The following table more clearly shows the effect of disulfide units on the crystallization rate of poly(phenylene sulfide):

| X | Tg | Tcc | Tch | Tm | T ½ (130° C.) |
|---|----|-----|-----|----|---------------|
| 0.25 | 88 | — | — | 238 | |
| 0.14 | 90 | — | — | 251 | |
| 0.12 | 94 | — | — | 255 | 132 Seconds |
| 0.10 | 92 | 168 | — | 243 | |
| 0.064 | 94 | 142 | 231 | 280 | |
| 0.055 | 95 | 140 | 226 | 278 | |
| 0.049 | 95 | 126 | 240 | 280 | |
| 0.000 | 91 | 126 | 242 | 278 | 12 Seconds |

The size of the polymer chain can conveniently be expressed as the total number of each kind of unit in the chain. Therefore, the copoly(arylene sulfide) prepared by the process of this invention can be more specifically expressed as corresponding to the structure $$[(-A-S-)_{1-x}(-A-S-S-)_x]_n$$
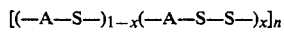

wherein n, the degree of polymerization, is at least 200 and is preferably in the range of 500 to 5,000 as determined by melt viscosity measurement at 300° C. The degree of polymerization when A is p-phenylene can be calculated using the relationship log (n)=1.473+0.2873×log (melt viscosity) where melt viscosity is measured in poise.

In the presence of the present invention a diiodoarylene compound in corresponding to the structure $$I-A-I$$

where A is a divalent arylene radical is reacted with elemental sulfur in a reaction zone containing a flowing oxygen-containing gas to produce a substantially linear copoly(arylene sulfide) having both (—A—S—) units and (—A—S—S—) units.

Diiodoaromatic compounds which can be utilized in the present proces include unsubstituted or substituted aromatics which have two iodine substituents. Suitable diiodoaromatic compounds include hydrocarbon aromatics, nitrogen-containing aromatics, sulfur-containing aromatics and oxygen-containing aromatics. Typical hydrocarbon aromatics include benzene and biphenyl, and condensed ring aromatics such as naphthalene and anthracene. Typical sulfur-containing aromatics include, for example, thiophene and benzothiophene. Typical nitrogen-containing aromatics include pyridine and quinoline. Suitable oxygen-containing aromatics are, for example, furan, dibenzofuran, etc. Substituted diiodoaromatic compounds suitable for use with the present invention include aromatic sulfones, diarylethers, diarylcarbonyls, diarylsulfides and the like.

The aromatic starting materials may be substituted by one or more alkyl groups, preferably alkyl groups having from 1-6 carbon atoms. Specially preferred alkyl groups are methyl, ethyl, propyl and butyl groups. There is no limitation on the spatial arrangement of the substituents, for example, the substituents may be on a carbon adjacent to an iodine bearing carbon or may be on a carbon atom further removed from the iodine bearing carbon.

Additional substituents on the aromatic compounds may include phenyl, halogen, hydroxy, nitro, amino, $C_{1-6}$ alkoxy, and carboxylate and carboxylic acid substituents, as well as aryl sulfones and aryl ketones.

Preferred diiodoaromatic compounds are the diiodobenzenes, diiodonaphthalenes, diiodobiphenyls, diiododiphenyl ethers and diiodotoluenes which may be unsubstituted or substituted with any of the substituents noted above.

Specific diiodoaromatic compounds suitable for the present invention include p-diiodobenzene, m-diiodobenzene, p,p'-diiodobiphenyl, m,p'-diiodobiphenyl, p,p'-diiododiphenyl sulfone, p,p'-diiododiphenyl ether, 2,6-diiodonaphthalene, and p,p'-diiodobenzophenone. p-Diiodobenzene, p,p'-diiodobiphenyl, and p,p'-diiododiphenyl ether are most preferred.

The diiodoaromatic starting materials of the present invention may be prepared by any suitable process. For example, the diiodoaromatic compounds may be prepared by standard liquid or gas phase iodination reactions. Although the diiodoaromatic compounds may be prepared by any such process, the preferred method of preparing the diiodoaromatic starting materials is that disclosed in copending application Ser. Nos. 912,806, filed Sept. 9, 1986 U.S. Pat. No. 4,746,758; 026,896, filed Mar. 17, 1987; 029,959, filed Mar. 25, 1987, U.S. Pat. No. 4,795,737 and 029,898, filed Mar. 25, 1987, U.S. Pat. No. 4,729,642. Alternatively, the diiodoaromatic compounds may be produced by a transiodination process such as that disclosed in copending application Ser. Nos. 029,899, filed Mar. 25, 1987, U.S. Pat. No. 4,792,841; 029,956, filed Mar. 25, 1987, U.S. Pat. No. 4,806,698; and 029,949, filed Mar. 25, 1987, U.S. Pat. No. 4,806,697. The disclosures of these copending applications are incorporated herein by reference for a more complete description of these preferred processes.

Sulfur is reacted as elemental sulfur and may consist of any of the standard forms which are possible for elemental sulfur. That is, the sulfur may be present in any of its allotropic modifications such as orthorhombic cyclooctasulfur ($S_8$) of any other cyclic elemental sulfur such as any of the cyclosulfur species having 6-12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98%-100%, although sulfur having a lower degree of purity may be used. This lack of sensitivity to the presence of impurities in the sulfur is advantageous to the present process when used as a commercial process since highly purified sulfur is not required and the associated expensive is not incurred.

An important feature of the process of this invention is that the polymerization is conducted in the presence of a flowing oxygen-containing gas. The gas useful in this invention can comprise any oxygen-containing gas such as air, pure oxygen or air enriched with oxygen. Air is preferred due to economics. The flow rate of the oxygen-containing gas can be in the range of 0.001 to 0.08 ft3/hr/mol of oxygen per mole of sulfur. More preferably the flow rate is in the range of 0.001 to 0.02 ft3/hr/mol of oxygen per mol of sulfur. Most preferably the flow rate is in the range of 0.005 to 0.02 ft3/hr/mol of oxygen per mol of sulfur. The flow of oxygen-containing gas can be accomplished by conventional means well known in the art.

In the process of the present invention sulfur reacts with a diiodoaromatic compound, eliminating elemental iodine and forming the PAS are shown below.

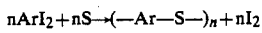

The formation of polymer is not sensitive to the relatively stoichiometry of the diiodoaromatic compound and sulfur. Accordingly, an excess of sulfur or an excess of diiodoaromatic compound may be used in the polymerization process. When excess sulfur is used, some disulfide linkages are observed in the polymer. Decreasing amounts of sulfur result in decreasing levels of disulfide linkages in the final polymer. When the diiodoaromatic compound is present in excess, polymerization to high polymer can still occur, if the excess diiodoaromatic compound is removed during final polymerization.

The polymerization reaction is preferably carried out in the absence of solvent by merely heating and reacting the sulfur and diiodoaromatic compound in the presence of the following stream of oxygen-containing gas. Under these conditions, the diiodoaromatic compound itself acts as a solvent for the sulfur which is melted thereby forming a substantially homogeneous solution enabling a facile and complete reaction.

In another embodiment, the diiodoaromatic compound can be dissolved in an organic solvent which is inert to the reaction conditions, i.e., which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in the polymerization of diiodobenzene with sulfur, one might use benzene, toluene or naphthalene as a solvent.

During the polymerization reaction between the diiodoaromatic compound and sulfur elemental iodine is produced and evolves from the reaction melt or solution, or solid. Removal of the elemental iodine provides a driving force for completion of the polymerization reaction. The iodine is removed by the flowing stream of oxygen-containing gas and is recovered by conventional measures.

The polymerization reaction is generally conducted at a temperature above about 175° C. Although the reaction may be conducted at temperatures below 175° C., the polymerization reaction is much slower. There is no particular upper temperature limit on the polymerization reaction, which may be conducted at any temperature below the decomposition temperature of the diiodoaromatic compound. For most polymerization reactions, temperatures in the range of about 175°–400° C. will be suitable, although for particular diiodoaromatic compounds temperatures in excess of 400° C. may be used. Particularly preferred temperature ranges are from about 180°–350° C.

The reaction is generally conducted for a period of at least one-half hour and is continued for up to about 10 hours or longer, and reaction times approaching infinity are theoretically possible. The exact reaction time will depend on the diiodoaromatic compound, the engineering requirements of the process, and the specific molecular weight, viscosity and physical properties of the desired product.

The polymerization reaction may be carried out in a batch reaction vessel or may be carried out as a semicontinuous or continuous process. Agitation of the reaction mixture is optional, however agitation or stirring assists in the production and yield of the polymeric product. Agitation of the reaction mixture may be accomplished by any known method, such as mechanical stirring, agitation can be accomplished by passing the stream of oxygen-containing gas through the reaction mixture.

In a preferred embodiment, the polymerization reaction is conducted on a continuous basis with the diiodoaromatic compound and sulfur being combined in a continuous staged reactor to form a reaction melt. The oxygen-containing gas, preferably air, is passed through the melt, preferably in a countercurrent direction, thereby accomplishing agitation and mixing of the reaction melt and at the same time removing the elemental iodine which is evolved and sweeping it out of the reactor.

The copolymer produced by the process of this invention is useful for preparation of various shaped articles such as pellets, fibers and molded articles. The polymer can be prepared into these shaped articles by conventional processes, such as injection molding and melt spinning.

Since there are no alkali metal containing materials in the reaction, there are no substantial quantities of alkali metal in the polymer matrix. Typically, there is less than 100 weight parts per million alkali metal, preferably less than 10 weight parts per million, based on the weight of the copoly(arylene sulfide). The absence of substantial quantities of alkali metal greatly enhance the capability of the polymer to be melt processed, particularly melt spun into fibers.

The copoly(arylene sulfide) and particularly the copoly(phenylene sulfide) produced by the process of this invention have an adjustable rate of crystallization, due to the presence of the disulfide linkages. Since the concentration of disulfide linkages can be varied over a wide range, the rate of crystallization can be readily adjusted to suit the technological application without unduly sacrificing other desirable characteristics of the polymer. In addition, the rate of crystallization can be further enhanced by the addition of conventional nucleating aids such as talc, terephthalic acid, silica or the like for those applications where extremely fast rates are desired.

Other features of the invention will become apparent in the course of the following descriptions of exemplary embodiments which are given for illustration of the invention and are not intended to be limiting thereof.

EXAMPLES

Example 1

This example illustrates the result of practicing the invention using a flow of oxygen-containing gas as well as the result of using an inert gas or using no flow of gas at all. Three identical runs are made using the following 38.0 g (1.185 mol) sulfur, 410.0 g (1.24 mol) 1,4-diiodobenzene, and 0.8 g of 1,3-diiodo-5-nitrobenzene. The reaction flask is a 500-mL 3-neck round-bottom flask. The melt is stirred through the center neck via a vacuum adapter and stirrer seal and using a stainless steel stirrer shaft and blade. The one side neck is fitted with a 350 mm length column topped with a vacuum-jacketed takeoff head with a thermal well inserted in the top and the takeoff head with a thermal well inserted in the top and the takeoff is connected to a 105 degree bend takeoff and then a 2-neck 500-mL, round-bottom flask cooled with dry ice for volatile collection and condensation. The column, head, and takeoff are wrapped with electric head tape and then fiberglass tape. The heating tape is heated via a variac set to give a temperature of ~100° C. determined by insertion of a thermocouple beneath the tape. The heating schedule is 2.5 h at 230° C. followed by 1.5 h at 240° C., followed by the reduction of pressure and increase in temperature as follows: 0.5 hr at 120 torr, 0.5 hr at 60 torr, and 0.5 hr at 30 torr. After that, the temperature is raised to 250° C. and the pressure reduced via vacuum pump to 0.5 torr. The gas sweep is maintained until the final stage where full vacuum is employed, at which point the sweep gas is turned off. The only difference in the three preparations is that for one there is a sweep of air at 0.1 ft³/hr/mol (0.02 ft³/hr/mol of oxygen) into the otherwise stoppered neck of the 3-neck flask, for the second the same flow rate of nitrogen is used instead of air and for the third no gas flow is used. Results are as summarized below:

| Sweep Gas | Yield, % | Crystallization From Melt Prep | Tch, °C. | Cal/g |
|---|---|---|---|---|
| Air | 101 | Thorough | 169 | 4.53 |
| Nitrogen | 102 | Mostly | 149 | 0.32 |
| None | 93.8 | None | None | — |

It is apparent that no sweep gives a poorer polymer from the standpoint of yield and crystallization. Although the nitrogen sweep has the same yield as the air sweep and a lower Tch value, which is generally interpreted as being more desirable for more rapid crystallization, it is apparent that the transition is much weaker. This is also borne out in the behavior of the better crystallization of the melt upon cooling from preparation seen for the air-sweep case:

Example 2

This example further illustrates the advantage of using a flow of oxygen-containing gas versus using nitrogen. The preparations cited in Example 1 above are repeated using 36.0 g (1.123 mol) sulfur, all other reactants and conditions being held the same. The results are as follows:

| Sweep Gas | Yield, % | Crystallization From Melt Prep | Tch, °C. | Cal/g |
|---|---|---|---|---|
| Air | 98.7 | In 4 Min. | 163 | 6.66 |
| Nitrogen | 96.1 | In 8 Min. | None | — |

The yield improvement and faster crystallization characteristics of the practice of the invention are evident from this data.

Example 3

This example further illustrates the use of a flow of oxygen-containing gas versus nitrogen. The preparations cited in Example 1 above are repeated using 34.0 g (1.061 mol) sulfur, all other reactants and conditions being held the same. The results are as follows:

| Sweep Gas | Yield, % | Tch, °C. | Tcc, °C. | Tm, °C. |
|---|---|---|---|---|
| Air | 105.7 | 147 | 185 | 265 |
| Nitrogen | 100.4 | 148 | 160 | 266 |

It is evident from this data that yield is improved and also that the crystallization on cooling peak in the DSC (Tcc) is at a much higher temperature for the air-sweep preparation wherein the invention is practiced. Since the crystallization on heating is the same for both runs, the difference between Tcc and Tch is higher for the air sweep. This difference is generally taken as being indicative of crystallization rate comparisons, the larger the difference the higher the rate.

Example 4

This example illustrates that if the flow of oxygen-containing gas is too high the reaction conditions are sufficiently upset to cause physical problems that result in a poorer polymer. The preparation regime of Example 1 is followed except that 32.0 g (0.998 mol) of sulfur is used in the preparation instead of the originally employed 38 g. The air sweep is increased to 0.5 ft³/hr/mol (0.1 ft³/hr/mol of oxygen). Polymer yield was 101.8%. DSC characteristics were poor. The Tch appeared at 193° C. and no Tcc was detected upon cooling. the disappearance of the Tcc transition is considered to mean a slower than desirable crystallization rate.

Example 6

This example further illustrates that a flow of oxygen-containing gas is beneficial to the crystallization characteristics of the polymer compared to use of nitrogen. Two identical runs are made as in Example 3 except that after the air-sweep and nitrogen-sweep reactions were held under high vacuum at 25° C. for 1 hour, the bath temperature was raised to 300° C. and condensation continued for 30 minutes. The final polymers were obtained in 96.2% (air-sweep) and 97.0% (nitrogen-sweep) yields, i.e., the same yield. Polymer properties via DSC were determined as follows:

| Sweep Gas | Tch, °C. | Cal/g | Tcc, °C. | Cal/g |
|---|---|---|---|---|
| Air | 124 | 0.34 | 166 | 0.38 |
| Nitrogen | 181 | 1.09 | 183 | 0.28 |
|  |  |  | 150 | 0.53 |
|  |  |  | 123 | 0.48 |

Although the Tch and Tcc transitions for the air sweep sample were weaker than those of the nitrogen sweep sample, Tch occurs at a lower temperature and the spread between Tch and Tcc is larger, both of which are more desirable.

We claim:

1. A process for producing a copoly(arylene sulfide) corresponding to the structure

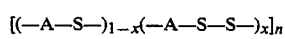

wherein A is a divalent substituted or unsubstituted aromatic radical, x is in the range of 0.5 to 0.001 and n is at least 200, comprising reacting within a reaction zone a mixture of a diiodoaromatic compound and elemental sulfur at a polymer producing temperature wherein the reaction zone contains an oxygen-containing gas flowing at a rate in the range of 0.001 to 0.08 ft3/hr/mol of oxygen per mole of said elemental sulfur.

2. The process of claim 1 wherein the diiodoaromatic compound is selected from the group consisting of hydrocarbon aromatics, sulfur-containing aromatics, nitrogen-containing aromatics and oxygen-containing aromatics.

3. The process of claim 2 wherein the diiodoaromatic compound is substituted with one or more alkyl groups having 1–6 carbon atoms.

4. The process of claim 1 wherein the diiodoaromatic compound is substituted with a member selected from the group consisting of phenyl, halogen, hydroxy, nitro, amino, $C_{1-6}$ alkoxy, carboxylate, carboxylic acid, aryl sulfone and aryl ketone groups.

5. The process of claim 1 wherein the diiodoaromatic compound is selected from the group consisting of diiodobenzenes, diiodonaphthalenes, diiodobiphenyls and diiodotoluenes.

6. The process of claim 1 wherein the diiodoaromatic compound is p-diiodobenzene, m-diiodobenzene, p,p′diiodobiphenyl, p,p′diiododiphenyl ether, or 2,6-diiodonaphthalene.

7. The process of claim 1 wherein the temperature is above about 175° C.

8. The process of claim 7 wherein the temperature is in the range of 175° to about 400° C.

9. The process of claim 8 wherein the temperature is in the range of 180° to 350° C.

10. The process of claim 1 wherein the oxygen-containing gas is air.

11. The process of claim 1 wherein the gas flow is in the range of 0.001 to 0.02 ft3/hr/mol of oxygen per mol of said elemental sulfur.

12. The process of claim 11 wherein the gas flow is in the range of 0.005 to 0.02 ft3/hr/mol of oxygen per mol of said elemental sulfur.

13. A process for producing a copoly(phenylene sulfide) corresponding to the structure

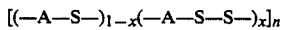

$$[(-A-S-)_{1-x}(-A-S-S-)_x]_n$$

wherein A is a divalent unsubstituted phenylene radical, x is in the range of 0.5 to 0.001, and n is at least 400, comprising reacting within a reaction zone a mixture of p-diiodobenzene and elemental sulfur at a temperature in the range of 180° to 350° C. wherein the reaction zone contains air flowing at a rate in the range of 0.005 to 0.02 ft3/hr/mol of oxygen per mol of said elemental sulfur.

* * * * *